(12) United States Patent
Diskin et al.

(10) Patent No.: US 8,379,819 B2
(45) Date of Patent: Feb. 19, 2013

(54) INDEXING RECORDINGS OF TELEPHONY SESSIONS

(75) Inventors: Alan Diskin, Galway (IE); Tony McCormack, Galway (IE); John Yoakum, Cary, NC (US); Neil O'Connor, Galway (IE)

(73) Assignee: Avaya Inc, Basking Ridge, NJ (US)

( * ) Notice: Subject to any disclaimer, the term of this patent is extended or adjusted under 35 U.S.C. 154(b) by 997 days.

(21) Appl. No.: 12/343,643

(22) Filed: Dec. 24, 2008

(65) Prior Publication Data

US 2010/0158204 A1 Jun. 24, 2010

(51) Int. Cl.
*H04M 15/00* (2006.01)
*H04L 12/16* (2006.01)
*G10L 21/00* (2006.01)

(52) U.S. Cl. ........ 379/185; 365/239; 370/260; 370/352; 379/85; 379/88.09; 379/88.25; 379/114.14; 379/202.01; 455/518; 704/221; 704/275; 709/224; 712/32; 713/170

(58) Field of Classification Search .................. 370/260, 370/352; 379/85, 88.01, 88.09, 88.23, 114.14, 379/185, 202.01, 68, 88.03; 455/518; 709/224; 712/32; 365/239; 704/221, 275; 713/170
See application file for complete search history.

(56) References Cited

U.S. PATENT DOCUMENTS

| | | | |
|---|---|---|---|
| 5,886,643 A * | 3/1999 | Diebboll et al. ............. 709/224 |
| 6,922,466 B1 | 7/2005 | Peterson |
| 7,092,496 B1 * | 8/2006 | Maes et al. ................. 379/88.01 |
| 7,170,886 B1 * | 1/2007 | Surazski et al. ............. 370/352 |
| 7,295,970 B1 * | 11/2007 | Gorin et al. .................... 704/221 |
| 7,330,536 B2 * | 2/2008 | Claudatos et al. .............. 379/68 |
| 7,453,828 B1 * | 11/2008 | Surazski et al. ............. 370/260 |
| 7,457,396 B2 * | 11/2008 | Claudatos et al. ......... 379/88.03 |
| 7,499,531 B2 * | 3/2009 | Claudatos et al. ......... 379/88.25 |
| 7,599,475 B2 * | 10/2009 | Eilam et al. ................. 379/88.09 |
| 7,751,538 B2 * | 7/2010 | Claudatos et al. ......... 379/88.25 |
| 7,801,288 B2 * | 9/2010 | Wasserblat et al. ...... 379/114.14 |
| 8,103,873 B2 * | 1/2012 | Claudatos et al. ............ 713/170 |
| 8,209,185 B2 * | 6/2012 | Claudatos et al. ............ 704/275 |
| 2006/0047518 A1 * | 3/2006 | Claudatos et al. ........... 704/275 |
| 2007/0136397 A1 * | 6/2007 | Pragada et al. ............... 707/204 |
| 2008/0084782 A1 * | 4/2008 | Fukada ........................ 365/239 |
| 2008/0095348 A1 * | 4/2008 | Abernethy et al. ...... 379/202.01 |
| 2008/0263010 A1 | 10/2008 | Roychoudhuri |
| 2009/0282217 A1 * | 11/2009 | Fontenot et al. ................ 712/32 |
| 2010/0048235 A1 * | 2/2010 | Dai et al. ...................... 455/518 |
| 2010/0158204 A1 * | 6/2010 | Diskin et al. .................... 379/85 |

FOREIGN PATENT DOCUMENTS

WO WO-02/082793 A1 10/2002

OTHER PUBLICATIONS

International Preliminary Report on Patentability in corresponding PCT/EP2009/009068.

* cited by examiner

*Primary Examiner* — Gerald Gauthier
(74) *Attorney, Agent, or Firm* — Barnes & Thornburg LLP

(57) ABSTRACT

Improved indexing of telephony sessions is achieved by:
(a) receiving, during the recording of the telephony session or during a playback of the recording, an indication including parameters which identify a discrete segment of the recording as being of interest; and
(b) storing, in an index associated with the recording of the session, an identifier which identifies that discrete segment of the recording.

10 Claims, 3 Drawing Sheets

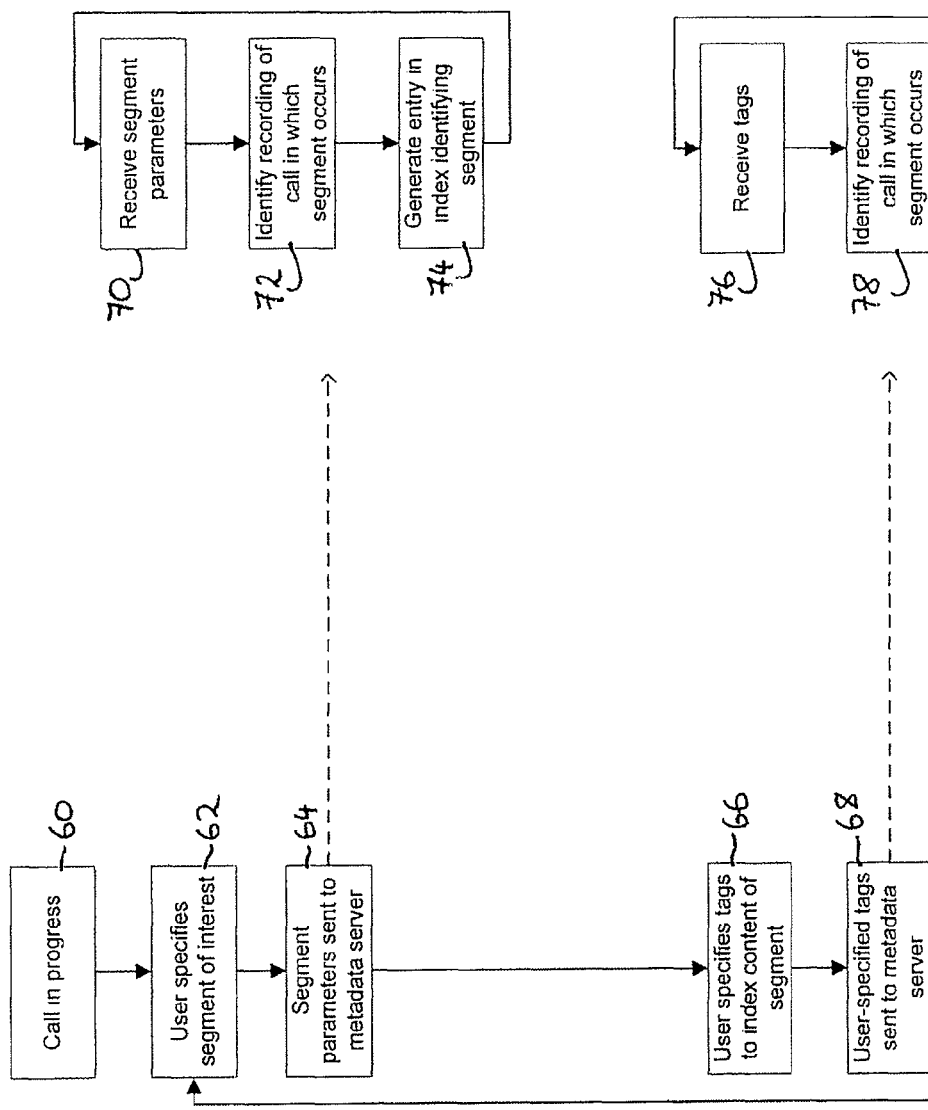

INDEXING RECORDINGS OF TELEPHONY SESSIONS

TECHNICAL FIELD

This invention relates to the indexing of recordings of telephony sessions.

BACKGROUND ART

It is well known to record voice and video telephony data for purposes such as legal compliance, record keeping and training. In businesses such as contact centers, such recordings are often made for all inbound and outbound telephony sessions, while the ever-decreasing cost of data storage and processing power means that such recording is becoming more commonplace for businesses and individuals, particularly in the context of Internet Protocol (IP) and other packet-switched telephony.

In addition to the raw audio (and video, where appropriate) data, it is usual to also record metadata to assist in indexing and later retrieval of a call recording. For example, a WAV audio file of a call received by an agent working in a contact center might be augmented with an XML (extensible markup language) file including various items of data including:
Date and time of call
Identifier of the contact center site
Agent's internal extension number/address
Agent's name/ID
Supervisor's name/ID
DNIS (dialed number identification service) identifying the number dialed in an inbound call from customer
CLID (caller line identification) identifying the originating number from which the inbound call originated
Customer ID
Skillset allocated to call by interactive voice response (IVR) system In addition, many contact center systems enable an agent engaged in a telephony session to assign one or more so-called "activity codes" to the session. Traditionally this was implemented by an agent pressing a numeric key to generate a DTMF (dual tone multi-frequency) audio signal into the call recording, with the different digits representing different activity codes. Thus, in a retail banking contact center, agents might employ the activity code "1" to denote "new loan", "2" for "overdraft increase", etc.

In the event that a call deals with several topics, the agent might insert different activity codes at different points during the call. For example, shortly after beginning a conversation in which the customer asks to check the balance of her account, the agent might press "5" to indicate "balance enquiry". The customer might subsequently enquire about the possibility of a new loan, at which point the agent enters activity code "1". The recording of this call would then have these tones (the DTMF tones for 5 and 1) embedded in the recording. An automated search facility can process the recording to index the call as relating to these activities, the activity codes being associated with timestamps which are typically specified as an offset from the beginning of the call.

In more recent systems, DTMF codes recorded onto the conversation itself have been supplanted by the agent using the telephony set or workstation desktop application to send digital signals to the private branch exchange (PBX) or switch and to the contact center management application, and these activity codes would be tracked by the contact center's historical database—i.e. not in call recording itself.

A disadvantage with such activity codes is that they require the agent to remember which code relates to which activity.

A further disadvantage is that such codes are finite and hard coded and require time, effort and money to extend. The addition of a new code requires development effort and staff training. Even after it is added there can be a lag of months or even years until enough data have been amassed from which to extract useful trends.

Activity codes are very much a specific solution useful to contact centers and have little application outside the context of an agent dealing with a specific and well-defined range of issues, each of which can be assigned a code.

A further drawback is that by simply marking a discrete point in the conversation with a code, it can be difficult for a subsequent reviewer of the call to know exactly when to begin listening for relevant information, particularly if the activity code was inserted by the agent some time after the conversation developed gradually to a point where the agent realized that the activity code was indeed relevant.

For example, consider two scenarios. The first is the banking call described above, in which a customer is informed of her account balance and then asks about getting a new loan. If the agent presses the "new loan" code immediately this request is made, it is probably true that the subsequent few minutes of conversation will record the pertinent content, such as discussion about the purpose of the loan, the amount required, the term of the loan, interest rate options and so on. A supervisor or reviewer of the conversation will be able to accurately use the activity codes to home in on the appropriate section of the recording.

The second scenario is one in which an agent is taking a call in a contact center selling various types of insurance, life assurance and pensions. An experienced agent may speak with a customer about a range of topics, such as income levels and future income expectations, family commitments, current insurance levels, existing life and pension policies, and so forth. At a given point during a discussion about pension needs, the agent may realize that the customer is also a suitable prospect for (say) life assurance based on the previous few minutes of conversation. If the agent enters the activity code for "new life assurance prospect" at the point this realization occurs to the agent, a reviewer who begins listening to the recording from that point onwards might not understand the reason why the agent flagged this customer as a particularly interesting life assurance prospect. Combine this with the fact that some agents will necessarily be more astute than others and may grasp a customer's needs sooner than other agents, and it can be seen that using an activity code as a timestamp or offset is a crude and inefficient way of indexing a recording of a telephony session.

Accordingly it can be seen that activity codes, while useful in a limited scenario in a contact center environment, can only insert flags having a limited range of meanings at given points in a conversation, which can be a crude and imperfect indexing method.

DISCLOSURE OF THE INVENTION

The invention provides a method of indexing a recording of a telephony session, carried out in a computerized system, the method comprising the steps of:
(a) receiving, during the recording of said telephony session or during a playback of said recording, an indication including parameters which identify a discrete segment of the recording as being of interest; and (b) storing, in an index associated with the recording of the session, an identifier which identifies said discrete segment of the recording.

Unlike activity codes in conventional contact centers, this indexing method stores an identifier or tag which identifies a discrete segment of the recording which is of interest, and thus enables the later retrieval of exactly the portion of the recording which is of interest, allowing for greater specificity. Activity codes in conventional contact centers are known to allow later identification of a timestamp within a recording which is associated with the activity code, but such codes provide no indication of where the interesting part of the recording occurs in relation to the timestamp.

Preferably, said identifier identifies said discrete segment by one of:

(i) a start point and an end point;
(ii) a reference point and a duration beginning with said reference point;
(iii) a reference point and a duration ending with said reference point;
(iv) a reference point and a duration centered on said reference point;
(v) a reference point, a first duration occurring before and ending with said reference point, and a second duration beginning with and occurring after said reference point;
(vi) a reference point, an offset forwards or backwards from the reference point, and a duration beginning with or ending with said offset.

Preferably, when the identifier identifies said discrete segment in accordance with (i) above (namely a start point and an end point), step (a) comprises:

(aa) receiving a first indication at a first point in time during the recording of said telephony session or during a playback of said recording, said first point in time being denoted as said start point; and
(ab) receiving a second indication at a second point in time during the recording of said telephony session or during a playback of said recording, said second point in time being denoted as said end point.

In implementation, a user of such a system can be provided with an interface to tag discrete segments comprising "start" and "stop" commands, or indeed the same command can be used to toggle between the states of stop and start. The system may then be configured to interpret such commands as the start and end points of discrete segments, respectively. Any suitable interface may be used.

Preferably, when the identifier identifies said discrete segment in accordance with any of (ii) to (vi) above (namely a discrete segment defined by, inter alia, a reference point), step (a) comprises:

(ac) receiving an indication at a point in time during the recording of said telephony session or during a playback of said recording, said point in time being denoted as said reference point.

Thus, each of the options (ii) to (vi) can be implemented by a user in a relatively intuitive way, with the "reference point" being implicit. For purely exemplary purposes, one can implement these techniques by providing a user with an interface to specify the parameters of the segment with reference to the time when the user issues the command or identifier, such as:

in the case of option (ii), a command to "tag the next 30 seconds"
in the case of option (iii), a command to "tag the last 25 seconds"
in the case of option (iv), a command to "tag the current minute" (i.e. the one minute segment centered on the time of issuance of the command)
in the case of option (v), a command to "tag the last 10 seconds and the next minute"
in the case of option (vi), a command to "tag the two-minute segment beginning three minutes ago"

Accordingly, in the case of a call having a duration of eight minutes and twelve seconds, six different exemplary tags could be defined in accordance with each of the options (i) to (vi) above as follows (it being understood that these are purely exemplary, and it being understood that in this example all times are defined as offsets from the beginning of the call):

(i) segment between 04:01 and 04:22
(ii) 30 second segment beginning at 02:53
(iii) 30 second segment ending at 05:00
(iv) 45 second segment centered at 04:09
(v) a segment comprising the 15 seconds leading up to 05:23 and the 25 seconds after 05:23
(vi) 3 minute segment beginning two minutes before 06:39

The user may be empowered with the ability to use as many or as few of these techniques for specifying offsets as desired by the designers of the system. Each method will have its own uses. In simplified interfaces, fewer (or perhaps only one) options will be given to users, and the parameters may be implicit. For example, a system may be configured so that the user simply has an interface command allowing him to tag a segment, with this command being interpreted as an identifier of the one-minute period centered on the reference point (namely the point during the call when the command was received).

Preferably, the method further comprises:
(c) receiving, in relation to said identified discrete segment, an indication of the content of the discrete segment.

Further, preferably, the method comprises:
(d) storing, in an index associated with the recording of the session, an indication of the content of the discrete segment.

In this way the method allows a user to identify the reason why a segment of the call was identified as being of interest. The details of implementation can be as simple or complex as desired, but in preferred embodiments, the user interface will enable the user either to select index terms from a set of such terms, or to freely create index terms or tags to describe the content of the discrete segment.

Preferably, the indication received in step (a) is received from an identifiable source, the method further comprising:
(e) storing, in an index associated with the recording of the session, an identification of said source from which said indication was received.

This allows the indexing not only of an identifiable segment of the recording (and optionally an indication of its content), but also the source, such as the user or workstation or telephone extension which identified the segment.

Optionally, steps (a), (b) and (e) may be repeated in respect of a plurality of indications received from different sources in relation to the same telephony session, whereby said plurality of different sources can each identify different segments of said recording in one or more indexes associated with said recording.

This feature has particular application in two areas of particular interest, namely the indexing of contact center communications sessions (e.g. telephone calls or video calls) and the indexing of conference calls (whether voice or video or both).

In the context of a contact center, enabling indexing of content by not only the agent(s) handling the call, but also by the supervisor and by subsequent reviewers, allows the call content to be tagged or indexed to whatever extent might be desired. For example, a supervisor conducting random "listen-in" on a group of agents can freely tag segments of interaction for subsequent action, e.g. for discussion with the agent, for later disciplinary action, for review, as an example of notably good/bad interaction, etc. Such tags can be hidden from other users by applying appropriate security to the indexes or by restricting access to the indexes, for example.

Another application is in the training of contact center agents. A number of trainees can be given recordings to review and tag based on their own judgment, and these tags can then be reviewed, graded and discussed to determine the effectiveness of the agent training (for example if it is expected that by 3 minutes into a call a competent agent should have identified the caller as being abusive, or as being a suitable candidate for a certain product or service).

In the context of conference calls, each participant can potentially identify segments of interest. The sharing of and access to such tags by others can be a matter for system design and security, as deemed appropriate. The method can be carried out on the conference bridge or associated equipment, or it can be carried out by an individual user who has an audio feed or access to the recording of the conference.

There is also provided a computer program product comprising a computer-readable medium encoding instructions which, when executed in a computerized system, are effective to cause said system to index a recording of a telephony session by carrying out the steps of the aforesaid methods.

We also provide a computerized indexing system for indexing a recording of a telephony session, comprising:
 (a) a connection for receiving, during the recording of said telephony session or during a playback of said recording, an indication including parameters which identify a discrete segment of the recording as being of interest;
 (b) a processor for determining from said indication said parameters; and
 (c) an index associated with the recording of the session, storing an identifier which identifies said discrete segment of the recording.

In another aspect there is provided a method of indexing a recording of a telephony session, carried out in a system accessible to a user involved in said telephony session or accessing said recording of said telephony session, the method comprising the steps of:
 (a) receiving an input from said user during the recording of said telephony session or during a playback of said recording;
 (b) generating, in response to said input, an indication including parameters which identify a discrete segment of the recording as being of interest; and
 (c) transmitting said indication to an indexing system.

The same method can also be executed by a computer program product comprising a computer-readable medium encoding instructions which, when executed in a computerized system accessible to a user involved in said telephony session or accessing said recording of said telephony session, are effective to cause said system to index a recording of a telephony session.

The computer program steps can be recorded on any suitable data carrier, such as a magnetic or optical carrier, a solid state memory or any other memory, as hard-wired instructions, as firmware, as an electrical signal, as a data transmission, or in any other way. References to a computerized system include distributed systems in which different components carry out different functions.

BRIEF DESCRIPTION OF THE DRAWINGS

The invention will now be further illustrated by the following descriptions of embodiments thereof, given by way of example only with reference to the accompanying drawings, in which:
FIG. 3 is a flowchart of an indexing method, as carried out at the user end;
FIG. 4 is a flowchart of a first portion of the same indexing method, as carried out at the indexing engine;
FIG. 5 is a flowchart of a second portion of the same indexing method, as carried out at the indexing engine.

DETAILED DESCRIPTION OF PREFERRED EMBODIMENTS

Figure 1:
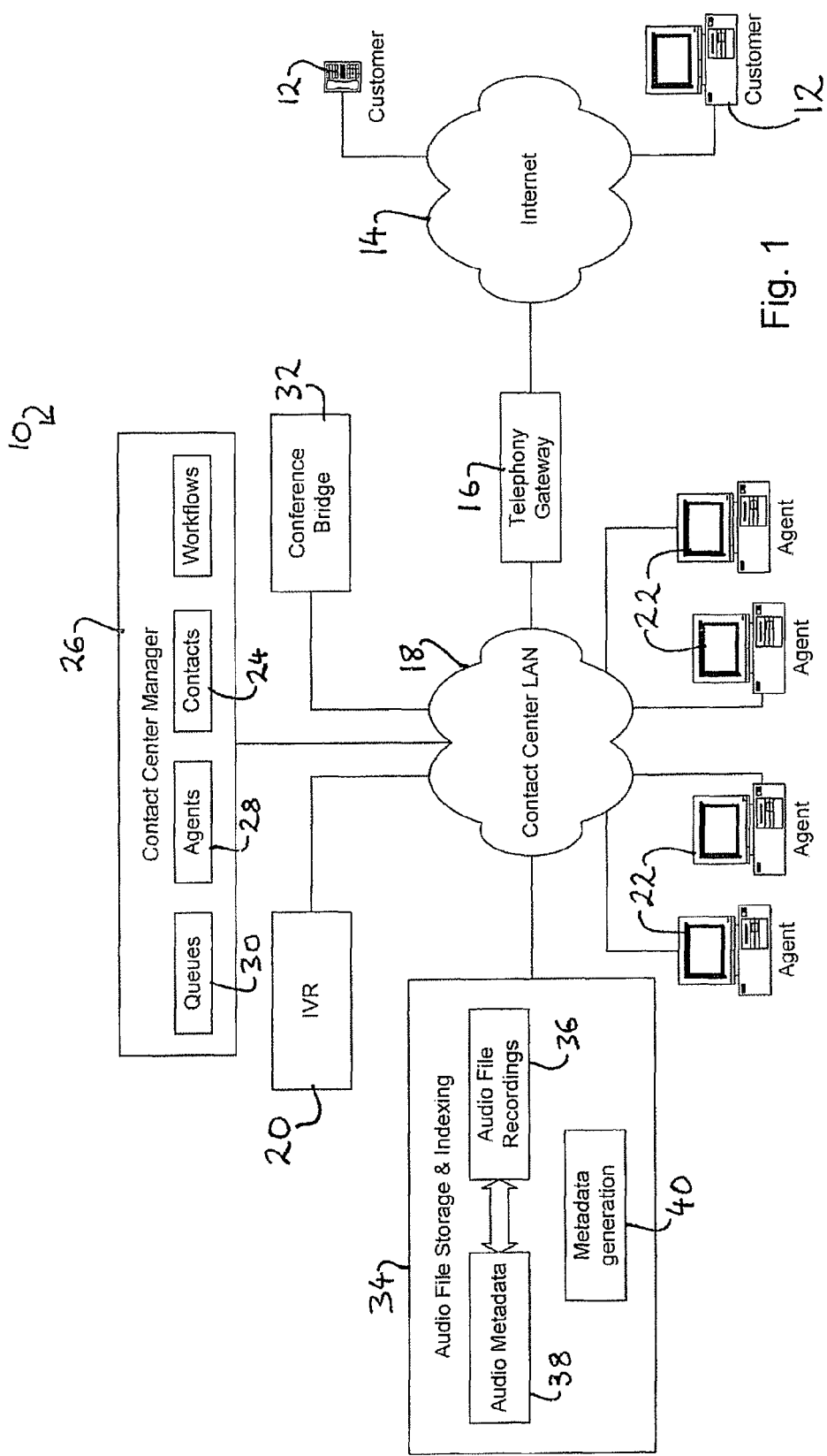
FIG. 1 is an architecture of a contact center and network implementing the method of indexing.

FIG. 1 shows a network architecture including a contact center, indicated generally at 10, to which a plurality of users (referred to in the context of a contact center as "customers") 12 connect via the Internet 14.

Various functions of the contact center are conventional and will be readily familiar to the skilled person. Customers 12 can connect in many different ways and using different media, but discussion will be limited to voice telephony for purely illustrative purposes, it being understood that the indexing method can be equally applied to other media not readily indexed, such as video calls.

As illustrated, a gateway 16 provides telephony services between a contact center local area network or LAN 18 and the Internet. Calls (also referred to herein under the umbrella term "communications session") can be inbound or outbound. Inbound calls are typically routed first through an interactive voice response (IVR) application 20 or through other automated treatments to determine further and more specific call handling requirements. Thus, a customer can be asked a series of questions and prompted for information to determine an appropriate skillset or skillsets needed by an agent 22 (i.e. a human representative of the contact center, who may be located in the same location or may log in remotely to the LAN 18) to handle the call.

If an agent with the required skillset(s) is not readily available, the call is queued until an agent is free, at which point the customer 12 is connected to the agent 22.

More specifically, the calls are represented as contacts 24 within a contact center management application 26. This application 26 also maintains a representation of the available agent resources 28, the various queues 30 (in which tokens representing the contacts 24 are queued and which are serviced by the agent resources) and the overall workflows 32 which define how contacts are handled at various stages based on parameters determined for the contacts. Physically, each call is typically terminated at a conference bridge or media application server 32 in its own conference, and the various treatments (such as IVR, music on hold (not shown), agent connection) are provided to the caller by conferencing in and out the IVR application 20, the agent 22, and so on.

As described thus far, the operation of contact center 10 is conventional. Also conventional is the provision of a call recorder. With decreasing storage costs it is increasingly common to record all calls in their entirety, for reasons which are well known, including minimizing liability, monitoring and documenting agent performance, systems analysis and improvement, etc. Again, the call recording equipment can be conferenced into each live conference to generate a recording of the call in that conference. The manner in which the call recordings are indexed is, however, not known from conventional systems and will now be described.

An audio file storage and indexing system or engine 34 is provided at the contact center (it being appreciated that any or all of the contact center components can be distributed across several sites, the relationship being logical and the connections being networked). The indexing system includes a first storage area 36 storing audio file recordings, a second storage area 38 storing audio metadata, and a metadata generation subsystem 40.

Figure 2:
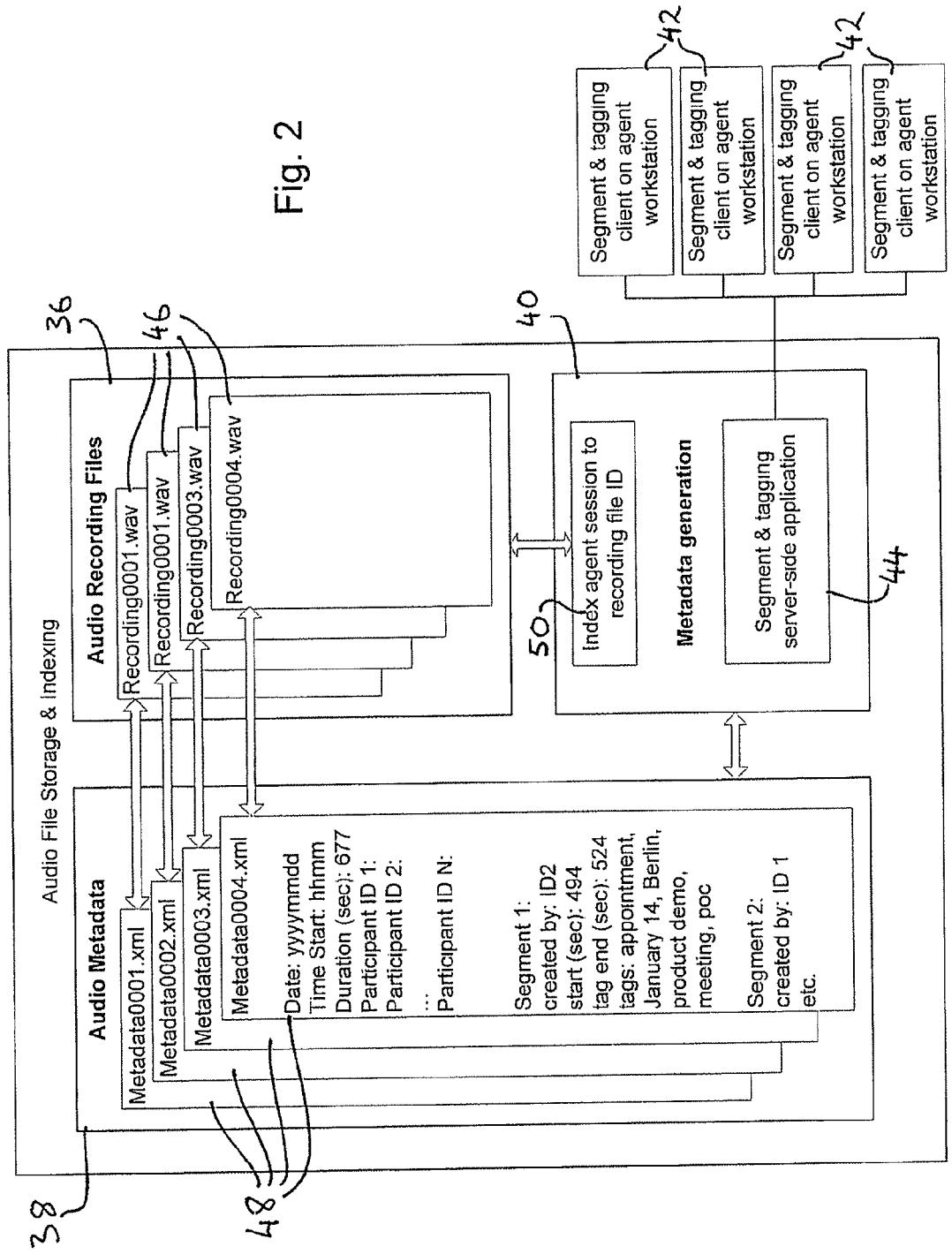
FIG. 2 is a representation of the structure of the audio file storage and indexing component of the contact center of FIG. 1.

Referring additionally to FIG. 2, the components of the audio file storage and indexing system or engine 34 are represented in a little more detail, in conjunction with a plurality of indexing clients 42 provided on the agent workstations 22 (FIG. 1). These clients 42 allow agents to identify a segment of a call in progress (or afterwards, when reviewing a call recording) and to specify a segment of the call as being of interest, as well as to tag the segment with appropriate keywords either selected from a list or freely entered into the client application.

The clients 42 send instructions including an indication having parameters specifying the particular segment of the call (which can be specified using any of the options discussed previously or in any other suitable manner), along with an indication of the tags assigned by the agent.

Each call in progress at the contact center is being recorded in a separate audio file 46 (such as a WAV data file) stored in audio recording file storage 36. Associated with each such file 46 is a unique metadata file 48 (such as an XML file). In the metadata file for each recording, any suitable metadata for indexing and subsequent searching and retrieval of audio files can be stored. In the exemplary file structure shown schematically in FIG. 2, each metadata file records the date and start time of the associated audio recording, the duration (once known), an identifier of each participant in the recording (customer, agent(s), supervisor(s), and optionally identifiers for any automated treatments like IVR). The list of participants can be augmented later with identifiers of any reviewers of the file or any editors of the file. Each access to the recording can, if appropriate be recorded in the list of "participants".

Also in the metadata are identifiers of segments of interest within the recording, one of which is shown (in the file metadata0004.xls, shown as Segment 1). The segment data indicates the ID of the creator of the segment, i.e. the user who flagged the segment as being of interest, the start time within the recording, the end time within the recording, and a series of tags chosen for indexing and retrieval of the segment, the tags including "appointment", "January 14", "Berlin, "product demo", "meeting" and "poc" (the latter being an acronym for Proof Of Concept).

Thus, metadata storage 38 with its XML files 48 provides an index associated with each recording 46 in the audio recording storage 36, whereby a user with appropriate access rights could search for a meeting in Berlin on January 14, to obtain a match with Segment 1 in file metadata0004.xls. This file being associated with the audio recording file Recording0004.wav, the segment of interest, namely the 30 second segment starting at 494 seconds into the recording, can be immediately retrieved and accessed.

Creation of the segment data within the metadata files is achieved by a segment and tagging server-side application 44 which receives and interprets the instructions from the segment and tagging clients 42. On receiving an instruction from a given client 42, a component 50 determines which recording that agent is currently involved in creating. From this information, the application 44 can identify the appropriate metadata file associated with that recording, and can translate the instructions received (e.g. tag a 2-minute segment beginning 3 minutes ago) into the appropriate form (e.g. segment start: 108 seconds; segment end 228 seconds).

Referring now to FIGS. 3-5, one can see the steps involved in creating a tagged segment on the client side (FIG. 3) and on the server side (FIGS. 4 and 5).

Beginning in FIG. 3, a call is in progress involving a user, step 60. The user specifies, using any suitable interface, a segment of interest, step 62. As described previously, this can be done in many different ways, such as options (i) to (vi), provided that a segment can be identified from parameters supplied by the user. The segment parameters are sent to the metadata server-side application, step 64. In step 66, the user specifies tags to be used in indexing the content, and in step 68, these tags are also sent to the server.

The identification of the segment and the identification of the tags are described separately for clarity. In fact the user can (and typically will), in a single step identify the segment parameters and the descriptive tags, and these can be sent as a single instruction or data set to the server. Similarly, the processes in FIGS. 4 and 5 which are now to be described, are shown as being separate processes for simplicity, whereas in fact they may suitably be implemented simultaneously or sequentially within a single process.

In FIG. 4, when the segment parameters are received from the user, step 70, the server-side application determines the recording in which the segment occurs, step 72. In step 74, the segment identification is written to the index (metadata file in the illustrated embodiment), before the FIG. 4 process awaits the next segment identification instruction.

While described predominantly in FIG. 2 in terms of an agent tagging segments of a live call in which that agent is involved while the call is in progress, the tagging could occur later, in which case the user is a reviewer of the file and the segment is identified during a review of the file. Nevertheless, the instruction will enable the server-side application to identify the relevant recording, and the time of issuance or receipt of the instruction can be synchronized with the reviewer's progress through the recording to determine the reference point used in the segment parameters. In other words, an instruction to tag the "next 30 seconds" can be translated into a start time and end time relative to the file start, based on information received as to where the reviewer is in the playback of the recording.

FIG. 5 shows the tagging of the segment on the server side. The tags as selected or created by the user are received in step 76. Similar to step 72, the appropriate recording is identified, step 78. (If the segment identification and tagging instructions are combined and processed together, then this identification need only occur once). Having identified the associated metadata file, the entry in relation to the segment in question is augmented by the user's tags, step 80.

It will be appreciated that the embodiment described in FIGS. 1 and 2 is exemplary only, and that the same or a similar indexing mechanism could be used in relation to telephony sessions not involving a contact center, such as regular telephone calls which a user records, or telephone conferences, which each participant may tag in a common index or in their own index, as appropriate.

The invention is not limited to the embodiments described herein which may be varied or modified without departing from the scope of the invention.

We claim:

1. A method of indexing a recording of a telephony session, carried out in a computerized system, the method comprising the steps of:
   (a) receiving, during the recording of said telephony session or during a playback of said recording, an indication including parameters which identify a discrete segment of the recording as being of interest; and
   (b) storing, in an index associated with the recording of the session, an identifier which identifies said discrete segment of the recording;
   wherein said identifier identifies said discrete segment by one of the following options:
   (i) a start point and an end point;
   (ii) a reference point and a duration beginning with said reference point;
   (iii) a reference point and a duration ending with said reference point;
   (iv) a reference point and a duration centered on said reference point;
   (v) a reference point, a first duration occurring before and ending with said reference point, and a second duration beginning with and occurring after said reference point;
   (vi) a reference point, an offset forwards or backwards from the reference point, and a duration beginning with or ending with said offset.

2. A method as claimed in claim 1, in which the identifier identifies said discrete segment by option (i), wherein step (a) of receiving, during the recording of said telephony session or during a playback of said recording, an indication including parameters which identify a discrete segment of the recording as being of interest, comprises:
   (aa) receiving a first indication at a first point in time during the recording of said telephony session or during a playback of said recording, said first point in time being denoted as said start point; and
   (ab) receiving a second indication at a second point in time during the recording of said telephony session or during a playback of said recording, said second point in time being denoted as said end point.

3. A method as claimed in claim 1, in which the identifier identifies said discrete segment by any of options (ii) to (vi) including a reference point and at least one duration, wherein step (a) of receiving, during the recording of said telephony session or during a playback of said recording, an indication identifying a discrete segment of the recording as being of interest, comprises:
   (ac) receiving an indication of said at least one duration, at a point in time during the recording of said telephony session or during a playback of said recording, said point in time being denoted as said reference point.

4. A method as claimed in claim 1, in which the identifier identifies said discrete segment by any of options (ii) to (vi) including a reference point and at least one duration, wherein step (a) of receiving, during the recording of said telephony session or during a playback of said recording, an indication identifying a discrete segment of the recording as being of interest, comprises:
   (ad) receiving an indication of said at least one duration, as well as an indication of said reference point in said recording.

5. A method as claimed in claim 1, further comprising:
   (c) receiving, in relation to said identified discrete segment, an indication of the content of the discrete segment.

6. A method as claimed in claim 1, further comprising:
   (d) storing, in an index associated with the recording of the session, an indication of the content of the discrete segment.

7. A method as claimed in claim 1, wherein said indication received in step (a) is received from an identifiable source, further comprising:
   (e) storing, in an index associated with the recording of the session, an identification of said source from which said indication was received.

8. A method as claimed in claim 7, in which steps (a), (b) and (e) are repeated in respect of a plurality of indications received from different sources in relation to the same telephony session, whereby said plurality of different sources can each identify different segments of said recording in one or more indexes associated with said recording.

9. A computer program product comprising a computer-readable medium encoding instructions which, when executed in a computerized system, are effective to cause said system to index a recording of a telephony session by the steps of:
   (a) receiving, during the recording of said telephony session or during a playback of said recording, an indication including parameters which identify a discrete segment of the recording as being of interest; and
   (b) storing, in an index associated with the recording of the session, an identifier which identifies said discrete segment of the recording;
   wherein said identifier identifies said discrete segment by one of the following options:
   (i) a start point and an end point;
   (ii) a reference point and a duration beginning with said reference point;
   (iii) a reference point and a duration ending with said reference point;
   (iv) a reference point and a duration centered on said reference point;
   (v) a reference point, a first duration occurring before and ending with said reference point, and a second duration beginning with and occurring after said reference point;
   (vi) a reference point, an offset forwards or backwards from the reference point, and a duration beginning with or ending with said offset.

10. A computerized indexing system for indexing a recording of a telephony session, comprising:
    (a) a connection for receiving, during the recording of said telephony session or during a playback of said recording, an indication including parameters which identify a discrete segment of the recording as being of interest;
    (b) a processor for determining from said indication said parameters; and
    (c) an index associated with the recording of the session, storing an identifier which identifies said discrete segment of the recording;
    wherein said identifier identifies said discrete segment by one of the following options:
    (i) a start point and an end point;
    (ii) a reference point and a duration beginning with said reference point;
    (iii) a reference point and a duration ending with said reference point;
    (iv) a reference point and a duration centered on said reference point;
    (v) a reference point, a first duration occurring before and ending with said reference point, and a second duration beginning with and occurring after said reference point;
    (vi) a reference point, an offset forwards or backwards from the reference point, and a duration beginning with or ending with said offset.

* * * * *